(12) United States Patent
Roy et al.

(10) Patent No.: US 8,478,894 B2
(45) Date of Patent: Jul. 2, 2013

(54) WEB APPLICATION RESPONSE CLOAKING

(75) Inventors: Patrick Roy, Gatineau (CA); Marc Graveline, Ottawa (CA); Ulf Viney, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1437 days.

(21) Appl. No.: 11/186,537

(22) Filed: Jul. 21, 2005

(65) Prior Publication Data

US 2007/0022210 A1    Jan. 25, 2007

(51) Int. Cl.
*G06F 15/16* (2006.01)
*G06F 9/00* (2006.01)

(52) U.S. Cl.
USPC .......... 709/236; 709/230; 709/232; 709/237; 726/11; 726/13

(58) Field of Classification Search
USPC ............... 709/206, 227, 229, 237, 230, 236, 709/232; 726/11–13, 22
See application file for complete search history.

(56) References Cited

U.S. PATENT DOCUMENTS

| | | | | |
|---|---|---|---|---|
| 5,918,013 A * | 6/1999 | Mighdoll et al. | | 709/217 |
| 6,169,992 B1* | 1/2001 | Beall et al. | | 707/103 R |
| 6,349,336 B1* | 2/2002 | Sit et al. | | 709/227 |
| 6,553,422 B1* | 4/2003 | Nelson | | 709/227 |
| 6,604,143 B1* | 8/2003 | Nagar et al. | | 709/229 |
| 7,249,196 B1* | 7/2007 | Peiffer et al. | | 709/246 |
| 7,316,028 B2* | 1/2008 | Donatelli et al. | | 726/11 |
| 7,392,323 B2* | 6/2008 | Yim et al. | | 709/236 |
| 7,406,709 B2* | 7/2008 | Maher et al. | | 726/12 |
| 2002/0016911 A1* | 2/2002 | Chawla et al. | | 713/153 |
| 2003/0061515 A1* | 3/2003 | Kindberg et al. | | 713/201 |
| 2003/0188001 A1* | 10/2003 | Eisenberg et al. | | 709/229 |
| 2003/0195933 A1* | 10/2003 | Curren et al. | | 709/206 |
| 2004/0044768 A1* | 3/2004 | Takahashi | | 709/225 |
| 2005/0198332 A1* | 9/2005 | Laertz et al. | | 709/229 |
| 2006/0041637 A1* | 2/2006 | Jerrard-Dunne | | 709/219 |

\* cited by examiner

*Primary Examiner* — Kevin Bates
*Assistant Examiner* — Robert B McAdams
(74) *Attorney, Agent, or Firm* — Shumaker & Sieffert, P.A.

(57) ABSTRACT

Method and system for centralized control of data transfers between a Web client and a Web application by receiving a response from the Web application. After determining an offending character is present, cloaking the response from the Web application to a request from a Web client, and sending the cloaked response to the Web client through a security product which otherwise rejects the offending character.

26 Claims, 6 Drawing Sheets

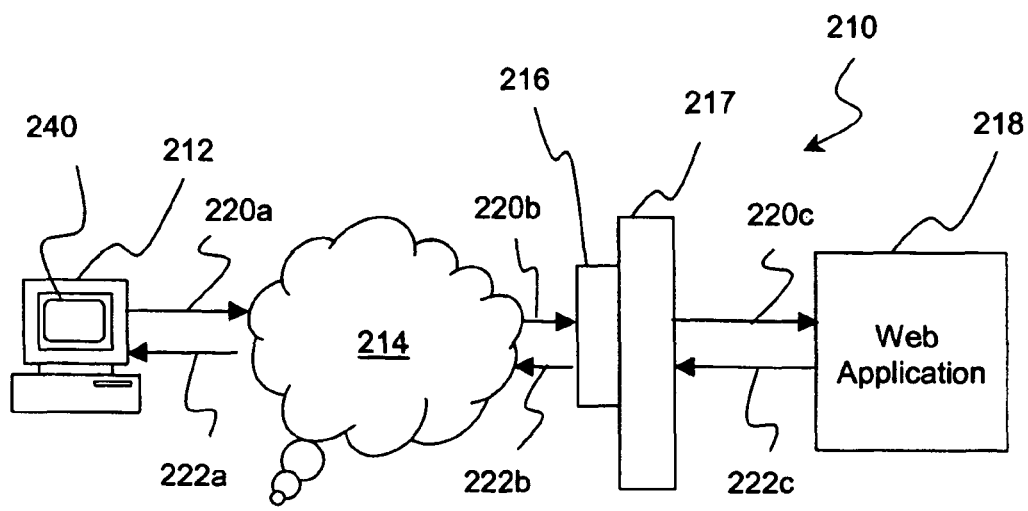
Figure 2 (a)   PRIOR ART
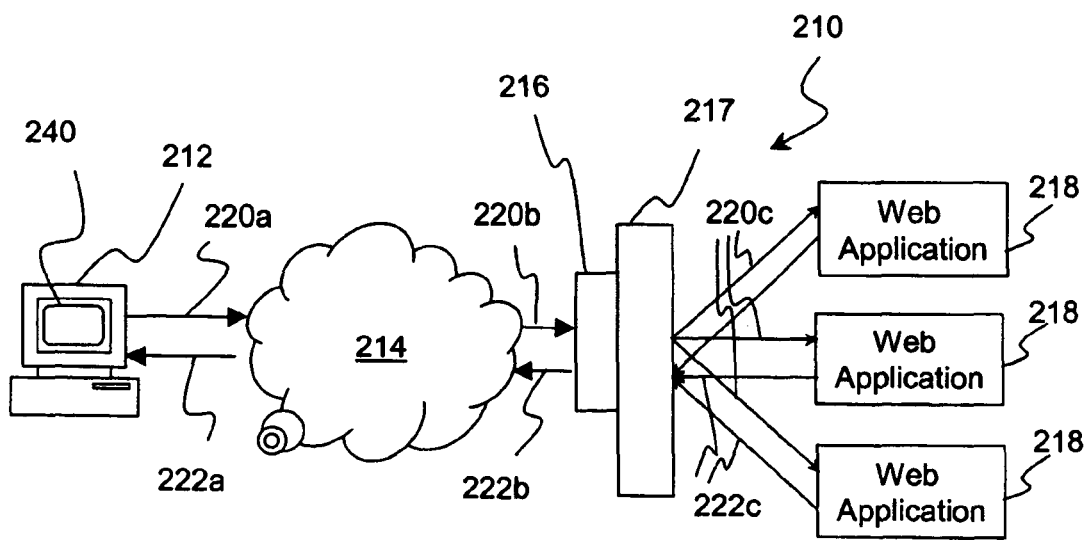
Figure 2 (b)   PRIOR ART

704 http://www.host.com/path?
data=<xml>offensive20%data20%for20%the
20%security20%filter</xml>

704a http://www.host.com/path?
CLOAKSTART_3cxml_3eoffensive*20data*20for*20the
*20security*20filter_3c/xml_e3CLOAKEND

WEB APPLICATION RESPONSE CLOAKING

FIELD OF INVENTION

The present invention relates to Web applications. More specifically, the present invention relates to Web application security.

BACKGROUND OF THE INVENTION

The Internet is by far the largest, most extensive publicly available network of interconnected computer networks that transmit data by packet switching using a standardized Internet Protocol (IP) and many other protocols. The Internet has become an extremely popular source of virtually all kinds of information. Increasingly sophisticated computers, software, and networking technology have made Internet access relatively straightforward for end users. Applications such as electronic mail, online chat and web client allow the users to access and exchange information almost instantaneously.

The World Wide Web (WWW) is one of the most popular means used for retrieving information over the Internet. The WWW can cope with many types of data which may be stored on computers, and is used with an Internet connection and a Web client. The WWW is made up of millions of interconnected pages or documents which can be displayed on a computer or other interface. Each page may have connections to other pages which may be stored on any computer connected to the Internet. Uniform Resource Identifiers (URI) is an identifying system in WWW, and typically consists of three parts: the transfer format (also known as the protocol type), the host name of the machine which holds the file (may also be referred to as the web server name) and the path name to the file. URIs are also referred as Universal Resource Locators (URLs). The transfer format for standard web pages is Hypertext Transfer Protocol (HTTP). Hyper Text Markup Language (HTML) is a method of encoding the information so it can be displayed on a variety of devices.

Web applications are engines that create Web pages from application logic, stored data, and user Input. Web applications often preserve user state across sessions. Web applications do not require software to be installed in the client environment. Web applications make use of standard Web browser components to view server-side built pages. Web application can also deliver services through programmatic interface like Software Development Kits (SDKs).

HTTP is the underlying transactional protocol for transferring files (text, graphic images, sound, video, and other multimedia files) between web clients and servers. HTTP defines how messages are formatted and transmitted, and what actions web servers and web client browsers should take in response to various commands. A web browser as an HTTP client, typically initiates a request by establishing a TCP/IP connection to a particular port on a remote host. An HTTP server monitoring that port waits for the client to send a request string. Upon receiving the request string (and message, if any), the server may complete the protocol by sending back a response string, and a message of its own, in the form of the requested file, an error message, or any other information. The HTTP server can take the form of a Web server with gateway components to process requests. A gateway is a custom web server module or plug-in created to process requests, and generally is the first point of contact for a web application. The term "gateway" is intended to include any gateways known to a person skilled in the art, for example, CGI; ISAPI for the Microsoft Internet Information Services (IIS) web server; Apache web server module, or a Java servlet.

Web pages regularly reference to pages on other servers, whose selection will elicit additional transfer requests. When the browser user enters file requests by either "opening" a Web file by typing in a Uniform Resource Locator (URL), or clicking on a hypertext link, the browser builds an HTTP request. In actual applications, Web clients may need to be distinguished and authenticated, or a session which holds a state across a plurality of HTTP protocols may need to be maintained by using "state" called cookie.

Web applications incur a security risk by accepting user input in their application logic. To reduce this risk, security filters can be installed at the entry point of Web applications. Security filters typically examine incoming request, apply generic security rules, and reject requests that fail to comply with these rules. A security rule can for example reject HTTP GET requests containing any of the following characters: greater than sign (<), the single quote ('), or the less than sign (>). Security filters are not tied to a specific Web application. If a corporate policy requires a security filter to be in place, it becomes the Web application responsibility to function in conjunction with the security filter rules. It can be difficult for complex and refined Web applications to meet the security filter rules without significant re-architecture. Typical installations will have many Web applications guarded by one security filter.

Therefore, there is a need for a method and apparatus that allows complex Web applications to function normally in an environment where a security filter has generic security rules enforced. Because the security filter can have a global scope and be required by policy, the method and apparatus cannot modify the security filter behavior. To be of value, the solution has to minimize the amount of changes to the Web application. Furthermore, the method and apparatus should respect the spirit of the security filter requirement policy by not simply offering a total bypass of the security filter.

A common approach to modify data exchanged between components is to insert a proxy between them that monitors communications both ways. The proxy can examine the data flow and modify it according to its own logic. Proxies can operate at the HTTP protocol level or as add-ons to applications. For example, the Java Servlet framework allows requests and responses to be sent through a Servlet proxy using the built-in chaining mechanism, or at the HTTP level, proxies can listen on a port and redirect traffic to a different port.

If a Web application creates requests with data that would trigger a security filter generic rule, it either has to stop sending that data, or transformed it as to not trigger rejection. Not sending the data can require major re-architecture of the Web application. Therefore, there is a need for transformation of the data through a proxy, because it can be accomplished with minimal architecture impact. A transformation that wraps the Web application data so as to preserve the original information but not trigger rejection can be referenced as a cloak operation. An analogy in the real world would be for a human (the data) to wear an enveloping cloak to pass unrecognized in front of a guard (security filter). Security filters are not commonly able to detect such subterfuge.

SUMMARY OF THE INVENTION

According to one aspect of the present invention there is provided a method of controlling data transfer between a Web client and a Web application through a proxy comprising the steps of: building a response with any application data, said application data forming part of subsequent requests; modifying the response in a proxy to cloak the application data; receiving said application data by the Web client; sending a request comprising said cloaked application data from the Web client through a security filter; reverting the cloaked application data of the request to a pre-cloak state in the proxy; and sending the reverted data to the Web application.

According to another aspect of the present invention there is provided a storage medium readable by a computer encoding a computer program for execution by the computer to carry out a method for controlling data transfer between a Web client and a Web application through a proxy, the computer program comprising: code means for building a response with any application data, said application data forming part of subsequent requests; code means for modifying the response in a proxy to cloak the application data; code means for receiving said application data by the Web client; code means for sending a request comprising said cloaked application data from the Web client through a security filter; code means for reverting the cloaked application data of the request to a pre-cloak state in the proxy; and code means for sending the reverted data to the Web application.

According to another aspect of the present invention there is provided a computer system for controlling data transfer between a Web client and a Web application through a proxy comprising: means for building a response with any application data, said application data forming part of subsequent requests; means for modifying the response in a proxy to cloak the application data; means for receiving said application data by the Web client; means for sending a request comprising said cloaked application data from the Web client through a security filter; means for reverting the cloaked application data of the request to a pre-cloak state in the proxy; and means for sending the reverted data to the Web application.

BRIEF DESCRIPTION OF THE DRAWINGS

The invention and the illustrated embodiments may be better understood, and the numerous objects, advantages, and features of the present invention and illustrated embodiments will become apparent to those skilled in the art by reference to the accompanying drawings. In the drawings, like reference numerals refer to like parts throughout the various views of the non-limiting and non-exhaustive embodiments of the present invention, and wherein:

FIG. 2 (a) shows a generic overview of a Web environment with one Web application;

FIG. 2 (b) shows a generic overview of a Web environment with a plurality of Web applications;

FIG. 3 (b) depicts an embodiment of an application firewall in collaboration with a security filter for a plurality of Web applications;

FIG. 4 (b) shows another embodiment of the present invention with a parameter list;

FIG. 6 illustrates an example of cloaked response.

DETAILED DESCRIPTION OF A PREFERRED EMBODIMENT

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
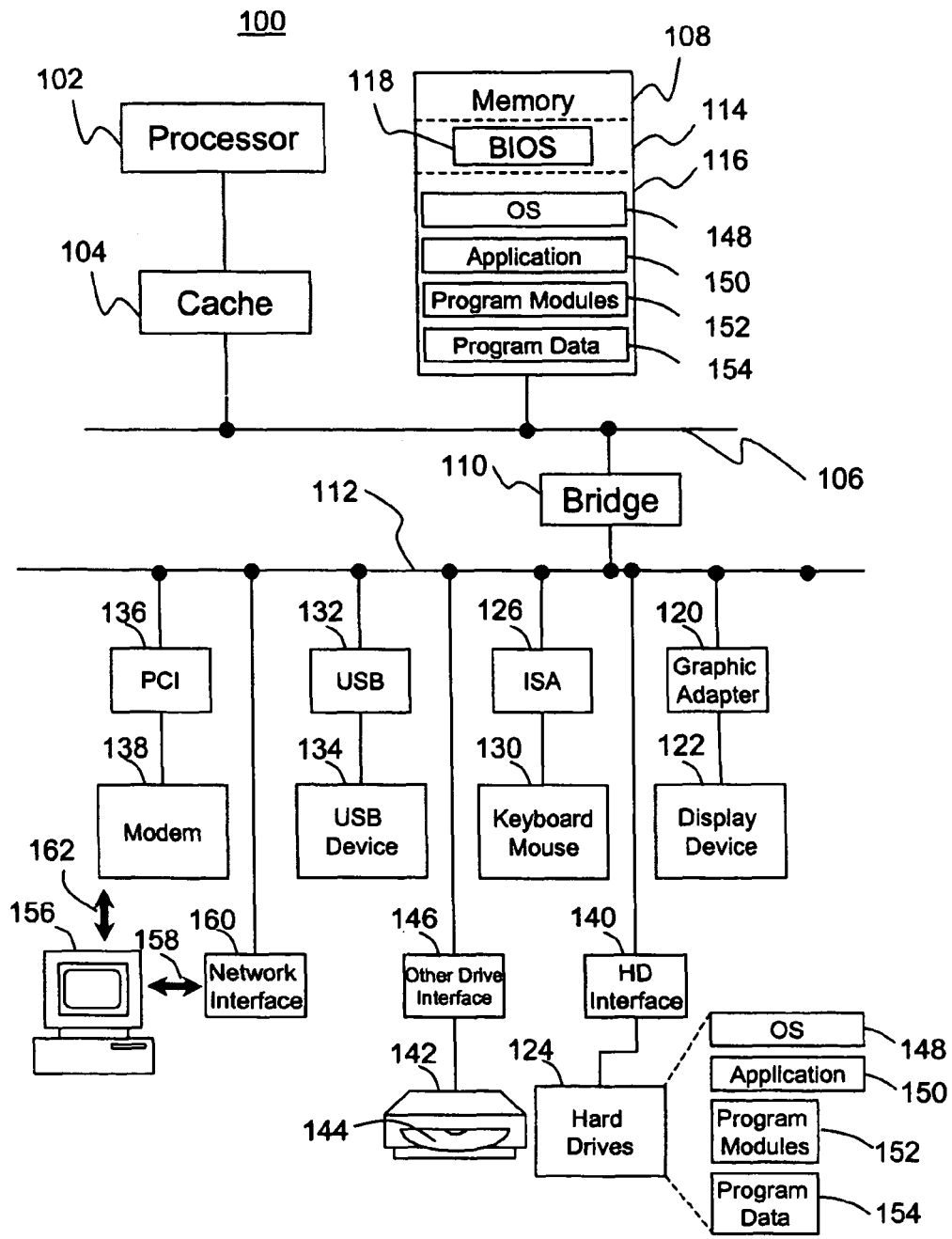
FIG. 1 shows a generic computing environment in which the present invention may be implemented.

FIG. 1 and the following discussion are intended to provide a brief general description. FIG. 1 illustrates a block diagram of a suitable computing environment in which a preferred embodiment of the present invention may be implemented.

Those skilled in the art will appreciate that the invention may be practiced with many computer system configurations, including personal computers, hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Although not required, the invention will be described in the general context of computer-executable instructions, such as program modules, being executed by a personal computer. Generally, program modules include routines, programs, objects, components, data structures and the like that perform particular tasks or implement particular abstract data types.

With reference to FIG. 1 an exemplary system 100 for implementing the invention may be, for example, one of the general purpose computers. The system 100 includes processor 102, which in the exemplary embodiment are each connected to cache memory 104, the cache 104 is connected in turn to a system bus 106 that couples various system components.

Also connected to system bus 1006 are a system memory 108 and a host bridge 110. Host bridge 110 connects I/O bus 112 to system bus 106, relaying and/or transforming data transactions from one bus to the other. The system bus 106 and the I/O bus 112 may be any of several types of bus structures including a memory bus or memory controller, a peripheral bus, and a local bus using any of a variety of bus architectures. The system memory includes read-only memory (ROM) 114 and random access memory (RAM) 116. A basic input/output system 118 (BIOS), containing the basic routines that help to transfer information between elements within the personal computer 100, such as during start-up, is stored in ROM 114.

In the exemplary embodiment, the system 100 may further include a graphics adapter 120 connected to I/O bus 112, receiving user interface information for display device 122. A user may enter commands and information into the system 100 through input devices 130 such as a conventional mouse, a key board 130, or the like. Other input devices 134 may include a microphone, joystick, game pad, satellite dish, scanner or the like. The devices may be connected via an Industry Standard Architecture (ISA) bridge 126, or a Universal Serial Bus (USB) bridge 132 to I/O bus 112, respectively. PCI device such as a modem 138 may be connected to the I/O bus 112 via PCI bridge 136.

The exemplary system 100 may further include a hard disk drive 124 for reading from and writing to a hard disk, connected to the I/O bus via a hard disk interface 140, and an optical disk drive 142 for reading from or writing to a removable optical disk 144 such as a CD-ROM or other optical media. The hard disk drive 124, magnetic disk drive 28, and optical disk drive 142 may be connected to the I/O bus 112 by a hard disk drive interface 140, and an optical drive interface 146, respectively. The drives and their associated computer-readable media provide non-volatile storage of computer readable instructions, data structures, program modules and other data for the system 100. Although the exemplary environment described herein employs a hard disk 124 and a removable optical disk 144, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk 124, optical disk 144, ROM 118 or RAM 116, including an operating system 148, one or more application programs 150, other program modules 152 and program data 154.

The exemplary system 100 may operate in a networked environment using logical connections to one or more remote computers, such as a remote computer 156. The remote computer 156 may be another personal computer, a server, a router, a network PC, a peer device or other common network node, and typically includes many or all of the elements described above relative to the exemplary system 100. The logical connections depicted in FIG. 1 include a network 158, for example, a local area network (LAN) or a wide area network (WAN). Such networking environments are commonplace in offices, enterprise-wide computer networks, intranets and the Internet.

When used in a networking environment, the exemplary system 100 is connected to the local network 158 through a network interface or adapter 160. The exemplary system 100 may use the modem 138 or other means for establishing communications 162 over a wide area network such as the Internet. In a networked environment, program modules depicted relative to the exemplary system 100, or portions thereof, may be stored in the remote memory storage device. It will be appreciated that the network connections shown are exemplary and other means of establishing a communications link between the computers may be used.

The exemplary embodiment shown in FIG. 1 is provided solely for the purposes of explaining the invention and those skilled in the art will recognize that numerous variations are possible, both in form and function. For instance, the exemplary system 100 may also include a magnetic disc drive, and numerous other optional components. All such variations are believed to be within the spirit and scope of the present invention. The exemplary system 100 and the exemplary figures below are provided solely as examples for the purposes of explanation and are not intended to imply architectural limitations. In fact, this method and system can be easily adapted for use on any programmable computer system, or network of systems, on which software applications can be executed.

FIG. 2 (a) provides an overview of a network 210 with an entry point 217 separating the Web application 218 with a client browser 240 on a computer 212 over an external network 214 such as Internet. The entry point 217 may be a Web server, a gateway or a point at which Web traffic can pass through unaltered. A security filter 216 may be placed in front of the entry point 217 to filter out undesired requests. The Web application 218 may be a business reporting engine.

FIG. 2 (b) shows an entry point 217 fronted by a security filter 216 servicing a plurality of Web applications.

Referring now to FIG. 2 (b), an application 218, for example a Business Intelligence application may be Installed in an environment where a security filter 216 is in effect before the entry point 217. A Web client 240 request 220 is sent to the application 218 through the security filter 216. The security filter may reject any request with questionable characters, for example, the greater than sign (<), the single quote ('), or the less than sign (>) in a GET request. The security filter 216 has no knowledge of the Web application 218. The security filter 216 is governed by a set of configurable rules. The rules are used by the security filter 216 to check the incoming requests 220 from the Web client 240, allowing the requests 220 to pass through if the requests meet the rules requirements. Therefore, legitimate responses from the Web applications 218 may also contain characters rejected by the security filter rules 216. Therefore, a security product, such as the security filter 216 may block legitimate requests from Web applications 218. The security filter 216 being located before the entry point 217 to the system, the Web application 218 has to ensure that data sent in requests will not trigger rejection in the filter while still being valid requests for the Web application 218.

Figure 3:
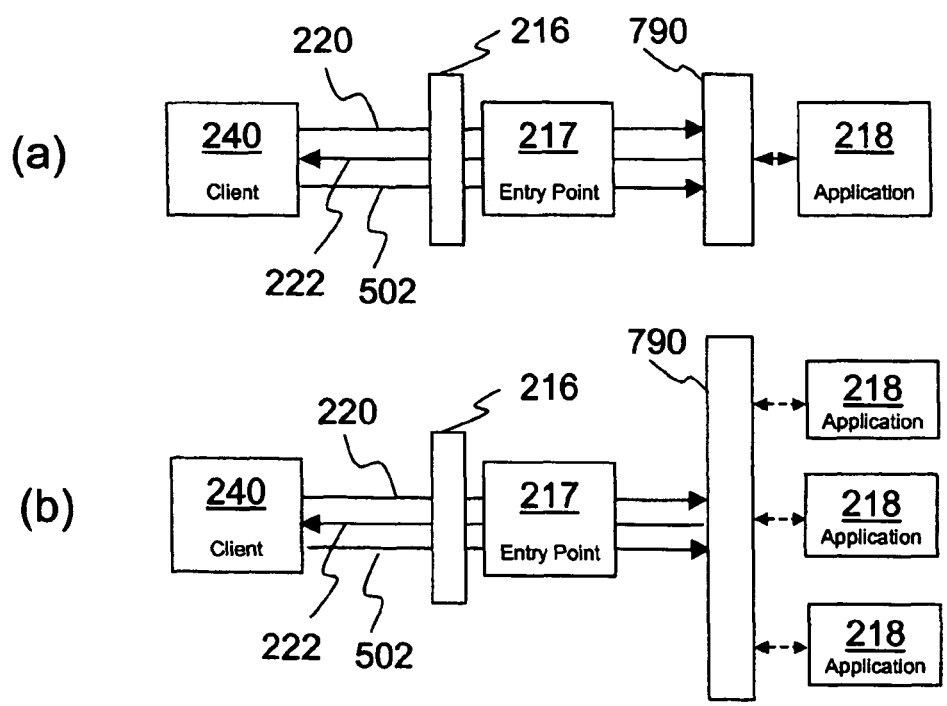
FIG. 3 (a) depicts an embodiment of an application firewall in collaboration with a security filter for one Web application.

Referring to FIG. 3 (a), in one embodiment of the present invention, a proxy 790 is a component which is used between the Web application 218 and the entry point 217. A proxy 790 may be implemented in hardware, software, firmware or a combination thereof. The proxy 790 monitors all requests and responses between the Web client 240 and the Web application 218. The proxy 790 identifies data in responses that will be part of subsequent requests and cloaks it before sending it to the entry point 217. The cloaking allows requests from the Web client 240 to pass through the security filter without triggering rejection. The proxy 790 also monitors Web client 240 requests to restore the cloak data to its initial pre-cloak state before handing them to the Web application 218.

Referring to FIG. 3 (b), in another embodiment of the present invention, a proxy 790 is responsible for cloaking data in responses and uncloaking data in requests from a plurality of Web applications 218.

Figure 4:
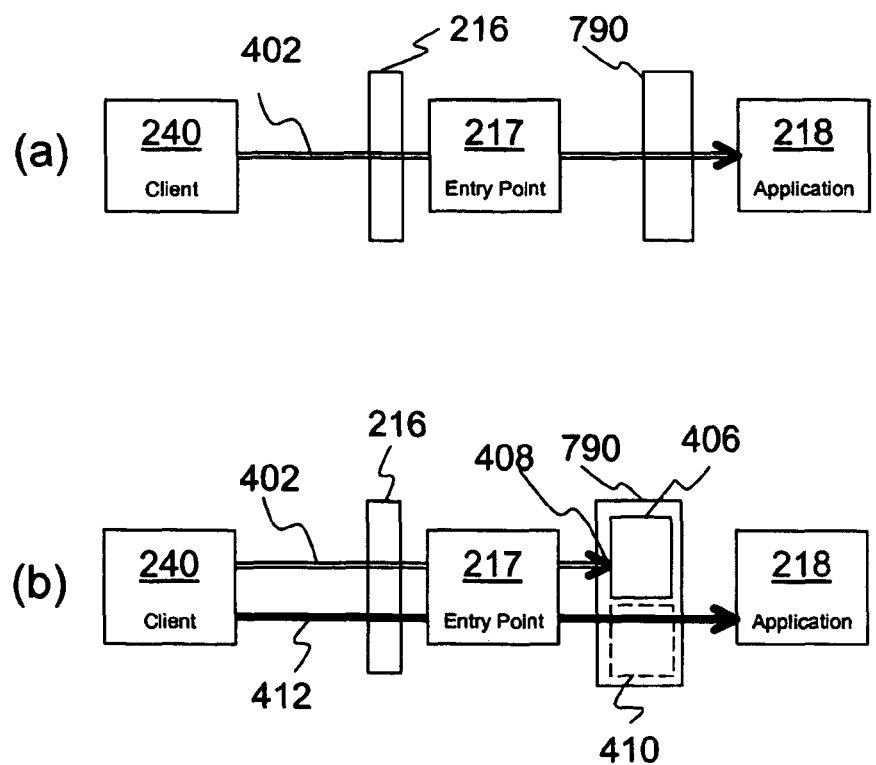
FIG. 4 (a) shows an embodiment of the present invention with a proxy.

Referring to FIG. 4 (a), the fact that the proxy 790 uncloaks data and that the cloaking algorithm is available to the Web client 240 may result in a security filter bypass mechanism. In other words, the client can send requests 402 to the Web application 218 with any data, cloak it, and have it go through 404 the security filter 216. This total bypass of the security filter might not be desirable. It negates the purpose of having the security filter in the first place. To preserve the security filter functionality, the proxy 790 can replicate the security filter rules 406. If the proxy 790 applies the rules on all request data then request rejection would occur at the proxy 790 as if it had occur at the security filter which would not help the Web application 218. To offer value, the proxy 790 must maintain a list 410 of parameters for which the rules do not apply 412. For all other parameters, the proxy 790 replicated the security filter rules 406 on the uncloaked data. When the proxy 790 receives a request, it uncloaks any cloak data. Then it applies the security filter rules on parameters not part of the list of parameters deemed safe. Request is blocked 408 if the rules requirements are not met. The emulation of the security filter is an optional behavior in the proxy 790. If total bypass of the security filter is deemed acceptable, then the security proxy 790 can uncloak all request data without enforcing the security filter rules on any parameters. The total bypass capability could be configured to a specific set of Web applications.

In one embodiment of the present invention, therefore, proxy 790 can modify GET URL parameters intended to be used in requests so that they skip detection by a security filter. Proxy 790 is the first component to receive requests and the last component to handle responses from the Web application's 218 point of view. This allows proxy 790 to cloak parameters that would offend the security filter transparently to the Web application.

To find the parameters to cloak, proxy 790 can either scan responses for presence of GET URL parameters or the GET URL parameters can be flagged by the Web application. Scanning for the parameters keeps the solution completely transparent to the Web application 218 but can be challenging to implement. Asking the Web application 218 to flag GET URL parameters by enclosing them in markers breaks transparency but renders the proxy task straight forward. Because of the Web application 218 knowledge of the content it generates, it can put markers around GET URL parameters. The proxy 790 guaranties the Web application 218 that the markers will be removed prior to reaching the Web client 240.

Once the proxy 790 has found GET URL parameters, it cloaks them based on a safe parameter list or cloaks all parameters if a list is not used, removes flagging markers if present, and sends the responses toward the Web client 240.

If transparency is not a requirement, a Web application 218 can call proxy 790 directly to have GET URL parameters cloaked.

If GET URLs parameters are built in the Web client 240, they cannot be cloaked by the proxy 790 since they are not present in the response. To handle these cases, the proxy 790 can insert a client-side cloaking function. The transparency requirement cannot totally be achieved in this case. The smallest impact change for the Web application 218 is to have the client code call the inserted proxy 790 function for all GET URLs parameters. The client code is unaware of the cloaking logic in the function. It simply passes all its parameters to this well-know function. Because the function is inserted by the proxy 790, it can dynamically adapt to the cloaking logic configuration.

When submitted back in a request, the cloak parameters are restored by proxy 790 to their pre-cloak values before reaching the Web application.

Only parameters in requests targeted at the Web application 218 should be cloaked. For example, requests to other Web sites can be created by the Web application 218 but should not be cloaked. The cloaking logic will only be applied if the requests will be received by proxy 790. Proxy 790 can check the gateway or the host in the URL to determine if it the request will reach the proxy thus needs to be cloaked.

The cloaking algorithm of proxy 790 has to avoid rejection for all combinations of rules and data in the security filter. The algorithm also has to account for any decoding of requests performed by the security filter.

Figure 5:
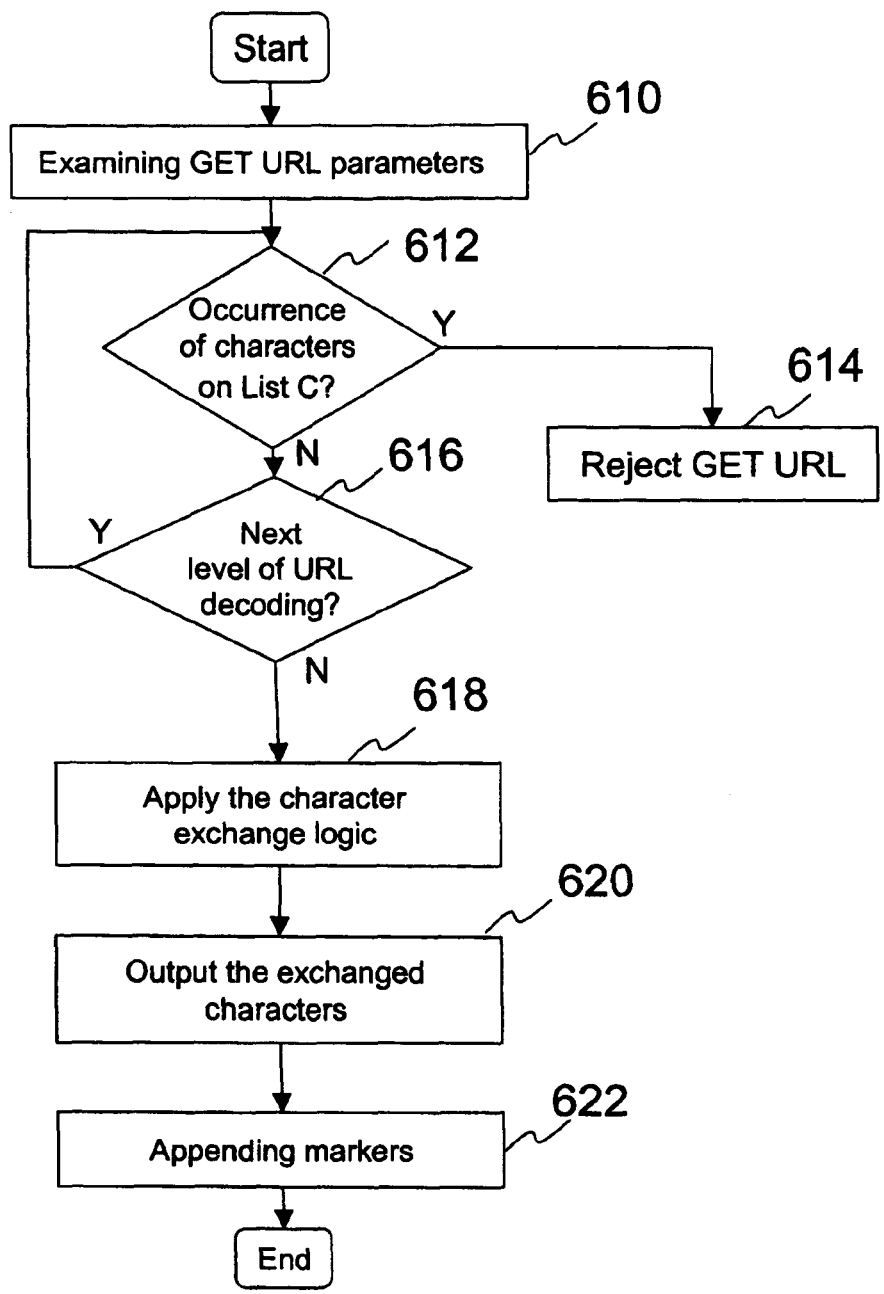
FIG. 5 shows the steps of an embodiment of a cloaking process.

Referring to FIGS. 2 and 5, in accordance with one embodiment of the present invention, and based on one security filter rule set, the rule set R is cloaked by the logic L where rule set R and cloaking logic L are defined as follows. Rule set R: reject 614 GET URL parameters if they contain a least one occurrence of one of the characters found in a configurable list C 612, perform multiple URL decoding on the GET URL parameters, the rejection logic is applied after each URL decoding until no more decoding occurs 616. The list of characters C, can be for example the characters greater than sign '<', the single quote ', or the less than sign '>'. Logic L: exchange all '%' characters with '*', exchange all characters in the list C and character '*' and '*' to '_##' where '##' is the hexadecimal value of the character 618, wrap the cloak data with a prefix 'CLOAKSTART" and a suffix 'CLOAKEND'622. The '%' to '*' is there for performance reason. Because there is typically many '%' characters in GET URL parameters, the substitution results in few characters than the main '_##' transformation. The prefix and suffix enables identification of cloak parameters. The uncloak algorithm is the reverse operation of the cloak algorithm where the suffix and prefix are removed, the '*' characters exchanged for '%' characters, and '_##' sequences are transformed to their matching character.

FIG. 6 illustrates an example of a response provided by the Web application 218 before the cloaking 704 and after the cloaking 704a.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). Further, a computer data signal representing the software code which may be embedded in a carrier wave may be transmitted via a communication network. Such a computer readable memory and a computer data signal are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A method of controlling data transfer, the method comprising:
   receiving, by a proxy comprising at least one processor, a first request sent from a Web client to request data from a Web application;
   sending, by the proxy, the first request to the Web application;
   receiving, by the proxy, response data from the Web application that is responsive to the first request sent from the Web client, wherein the proxy monitors requests and responses between the Web client and the Web application, and wherein the proxy is configured to be implemented by at least one computer;
   identifying, by the proxy, application data in the response data that will also be included as part of a second, different request that will be subsequently sent from the Web client to the Web application, wherein the identified application data comprises only a subset of the response data;
   modifying, by the proxy, the response data to cloak only the identified application data using a cloak algorithm to form cloaked application data configured to pass through a security filter without rejection by the security filter, wherein the proxy communicatively couples the Web application to the security filter, and wherein the cloak algorithm implements character exchange logic to transform one or more characters of the identified application data into one or more other characters or sequences;
   sending the cloaked application data from the proxy to the Web client via the security filter;
   subsequent to sending the cloaked application data from the proxy to the Web client, receiving, by the proxy, the second request comprising the cloaked application data from the Web client via the security filter, wherein the second request is distinct from both the response data and from the first request;
   reverting, by the proxy, the cloaked application data of the second request to a pre-cloak state using an uncloak algorithm, wherein the uncloak algorithm is a reverse operation of the cloak algorithm that was previously used to cloak the identified application data of the response data that was previously received from the Web application, and wherein the uncloak algorithm transforms the one or more other characters or sequences of the cloaked application data back into the one or more characters; and
   sending the reverted application data comprising the one or more characters from the proxy to the Web application.

2. The method as claimed in claim 1, wherein the proxy is a component of the Web application.

3. The method as claimed in claim 1, wherein the proxy is a stand-alone service.

4. The method as claimed in claim 1, wherein the proxy is an application firewall.

5. The method as claimed in claim 1, wherein the proxy is shared by multiple Web applications.

6. The method as claimed in claim 1, wherein the security filter is a Web server security filter.

7. The method as claimed in claim 1, wherein the security filter is a hardware firewall.

8. The method as claimed in claim 1, wherein the response data contains HTTP GET parameters.

9. The method as claimed in claim 1, further comprising configuring the proxy according to a configuration of the security filter.

10. The method as claimed in claim 1, wherein the security filter performs decoding on request before applying rules.

11. The method as claimed in claim 1, further comprising inserting client-side cloaking logic to cloak the application data.

12. The method as claimed in claim 1, further comprising:
   identifying Web parameters in a safe parameters list for cloaking the application data, wherein security filter rules do not apply to the Web parameters in the safe parameters list;
   receiving the second request comprising the cloaked application data; and
   applying the security filter rules on parameters in the reverted application data that are not part of the safe parameters list.

13. The method as claimed in claim 1, further comprising enforcing the rules of the security filter by the proxy.

14. A computer readable storage device comprising a computer program for execution by at least one processor to:
   receive, by a proxy, a first request sent from a Web client to request data from a Web application;
   send, by the proxy, the first request to the Web application;
   receive, by the proxy, response data from the Web application that is responsive to the first request sent from the Web client, wherein the proxy monitors requests and responses between the Web client and the Web application;
   identify, by the proxy, application data in the response data that will also be included as part of a second, different request that will be subsequently sent from the Web client to the Web application, wherein the identified application data comprises only a subset of the response data;
   modify, by the proxy, the response data to cloak only the identified application data using a cloak algorithm to form cloaked application data configured to pass through a security filter without rejection by the security filter, wherein the proxy communicatively couples the Web application to the security filter, and wherein the cloak algorithm implements character exchange logic to transform one or more characters of the identified application data into one or more other characters or sequences;
   send the cloaked application data from the proxy to the Web client via the security filter;
   subsequent to sending the cloaked application data from the proxy to the Web client, receive, by the proxy, the second request comprising the cloaked application data from the Web client via the security filter, wherein the second request is distinct from both the response data and from the first request;
   revert, by the proxy, the cloaked application data of the second request to a pre-cloak state using an uncloak algorithm, wherein the uncloak algorithm is a reverse operation of the cloak algorithm that was previously used to cloak the identified application data of the response data that was previously received from the Web application, and wherein the uncloak algorithm transforms the one or more other characters or sequences of the cloaked application data back into the one or more characters; and send the reverted application data comprising the one or more characters from the proxy to the Web application.

15. The computer readable storage device as claimed in claim 14, wherein the proxy is a component of the Web application.

16. The computer readable storage device as claimed in claim 14, wherein the proxy is a stand-alone service.

17. The computer readable storage device as claimed in claim 14, wherein the proxy is an application firewall.

18. The computer readable storage device as claimed in claim 14, wherein the proxy is shared by multiple Web applications.

19. The computer readable storage device as claimed in claim 14, wherein the computer program is further executed by the at least one processor to configure the proxy according to a configuration of the security filter.

20. The computer readable storage device as claimed in claim 14, wherein the computer program is further executed by the at least one processor to decode the request by the security filter before applying rules.

21. The computer readable storage device as claimed in claim 14, wherein the computer program is further executed by the at least one processor to insert client-side cloaking logic to cloak the application data.

22. The computer readable storage device as claimed in claim 14, wherein the computer program is further executed by the at least one processor to:
identify Web parameters in a safe parameters list for cloaking the application data, wherein security filter rules do not apply to the Web parameters in the safe parameters list;
receive the second request comprising the cloaked application data; and
apply the security filter rules on parameters in the reverted application data that are not part of the safe parameters list.

23. The computer readable storage device as claimed in claim 14, wherein the computer program is further executed by the at least one processor to enforce the rules of the security filter by the proxy.

24. The method as claimed in claim 1, wherein:
modifying the response data to cloak the identified application data using the cloak algorithm to form the cloaked application data comprises including the identified application data between a predefined prefix and a predefined suffix in order to enable identification of the cloaked application data.

25. The computer readable storage medium as claimed in claim 14, wherein the cloak algorithm includes the identified application data between a predefined prefix and a predefined suffix in order to enable identification of the cloaked application data.

26. A proxy device, comprising:
at least one processor;
at least one computer readable storage media; and
one or more program modules stored on the at least one computer readable storage media,
wherein the one or more program modules are executable by the at least one processor to:
receive a first request sent from a Web client to request data from a Web application;
send the first request to the Web application;
receive response data from the Web application that is responsive to the first request sent from the Web client, wherein the proxy device monitors requests and responses between the Web client and the Web application;
identify application data in the response data that will also be included as part of a second, different request that will be subsequently sent from the Web client to the Web application, wherein the identified application data comprises only a subset of the response data;
modify the response data to cloak only the identified application data using a cloak algorithm to form cloaked application data configured to pass through a security filter without rejection by the security filter, wherein the proxy device communicatively couples the Web application to the security filter, and wherein the cloak algorithm implements character exchange logic to transform one or more characters of the identified application data into one or more other characters or sequences;
send the cloaked application data to the Web client via the security filter;
subsequent to sending the cloaked application data to the Web client, receive the second request comprising the cloaked application data from the Web client via the security filter, wherein the second request is distinct from both the response data and from the first request;
revert the cloaked application data of the second request to a pre-cloak state using an uncloak algorithm, wherein the uncloak algorithm is a reverse operation of the cloak algorithm that was previously used to cloak the identified application data of the response data that was previously received from the Web application, and wherein the uncloak algorithm transforms the one or more other characters or sequences of the cloaked application data back into the one or more characters; and
send the reverted application data comprising the one or more characters to the Web application.

* * * * *